(12) United States Patent
Zeng et al.

(10) Patent No.: US 8,621,945 B2
(45) Date of Patent: Jan. 7, 2014

(54) METHOD AND APPARATUS FOR IMPROVING THE TEMPERATURE STABILITY AND MINIMIZING THE NOISE OF THE ENVIRONMENT THAT ENCLOSES AN INTERFEROMETRIC MEASURING SYSTEM

(75) Inventors: An Andrew Zeng, Fremont, CA (US); Shouhong Tang, Santa Clara, CA (US); Steve Cui, Fremont, CA (US)

(73) Assignee: KLA Tencor, Milpitas, CA (US)

( * ) Notice: Subject to any disclaimer, the term of this patent is extended or adjusted under 35 U.S.C. 154(b) by 287 days.

(21) Appl. No.: 13/079,143

(22) Filed: Apr. 4, 2011

(65) Prior Publication Data
US 2012/0118061 A1   May 17, 2012

Related U.S. Application Data

(60) Provisional application No. 61/413,470, filed on Nov. 14, 2010.

(51) Int. Cl.
*G01D 11/24* (2006.01)

(52) U.S. Cl.
USPC ............................................ 73/865.6

(58) Field of Classification Search
None
See application file for complete search history.

(56) References Cited

U.S. PATENT DOCUMENTS

| | | | | |
|---|---|---|---|---|
| 2,286,621 | A * | 6/1942 | Hurley | 356/517 |
| 2,536,025 | A * | 1/1951 | Blackburn | 73/24.01 |
| 4,802,541 | A * | 2/1989 | Bator et al. | 177/212 |
| 5,195,922 | A | 3/1993 | Genco | |
| 5,960,638 | A | 10/1999 | McCabe | |
| 6,632,260 | B1 | 10/2003 | Siemers | |
| 2001/0035058 | A1 * | 11/2001 | Wanek et al. | 73/865.6 |
| 2009/0185190 | A1 * | 7/2009 | Weinberger et al. | 356/450 |

* cited by examiner

*Primary Examiner* — Robert R Raevis
(74) *Attorney, Agent, or Firm* — Deborah Wenocur

(57) ABSTRACT

Disclosed herein is a method and system for providing environmental control for a vibration sensitive system such as an interferometric measurement system, while minimizing acoustic noise during data acquisition.

10 Claims, 3 Drawing Sheets

METHOD AND APPARATUS FOR IMPROVING THE TEMPERATURE STABILITY AND MINIMIZING THE NOISE OF THE ENVIRONMENT THAT ENCLOSES AN INTERFEROMETRIC MEASURING SYSTEM

CROSS REFERENCE TO RELATED APPLICATION

This invention is related to U.S. Provisional Application No. 61/413,470, filed Nov. 14, 2010, and claims priority thereto. Application No. 61/413,470 is hereby incorporated by reference in its entirety.

FIELD OF THE INVENTION

This invention relates to measurement systems and methods, and in particular to interferometric measuring systems.

BACKGROUND

Many sensitive systems such as measurement systems require controlled environments in order to ensure stability and repeatability, as well as system to system matching. An example thereof is an interferometric measurement system such as NanoMapper or WaferSight (both measurement systems made by KLA-Tencor Corporation.

Environmental control and stability for sensitive systems is best provided by creating a stable mini-environment which encloses the system. Examples of controlled mini-enclosures for use as discussed above are described in:
1. U.S. Pat. No. 5,195,922, issued March 1993 discloses a modular chamber which encloses the work pieces and processing instruments to isolate them from the others in the room. The chamber creates a mini environment that permits control over particulate contamination and individualized regulation from others within a single room.
2. U.S. Pat. No. 5,960,638, issued October 1999, discloses a mall environmental control unit (ECU) for mini-enclosures. Each ECU has the capability of controlling temperature, humidity, and airflow rate delivered into the enclosure. It is mounted on the top of individual mini-enclosure to make the enclosure have its own environmental control.
3. U.S. Pat. No. 6,632,260, issued October 2003, discloses a clean gas flow enclosure that provides for the isolation of material from airborne micro-particulate contamination. The enclosure is able to adjust the clean gas flow in different directions by the pressure differential distribution technology.

Though each of the above cited systems provides some aspects of environmental control, none of the systems provides all aspects of the control required for sensitive systems such as interferometric measurement systems.

SUMMARY

Disclosed herein is a method and system for providing environmental control for a vibration sensitive system such as an interferometric measurement system, while minimizing acoustic noise during data acquisition.

DETAILED DESCRIPTION

An important environmental control for interferometric systems, and in particular interferometric measurement systems, is temperature control, since temperature affects the range and stability of measurement results. Lack of accurate temperature control can therefore greatly deteriorate time matching or system to system matching Accordingly, an aspect of the inventive system is providing a thermally stable mini environment that encloses an interferometric measurement system so as to improve its measurement repeatability and system to system matching. Another aspect of the inventive system is providing a thermally stable enclosure with air circulation designed to meet the requirements of the SEMI S2 standards for a clean mini environment.

Thermal control and air circulation as disclosed above can cause acoustic noise and vibration, both of which can contribute to measurement error and other adverse effects on vibration sensitive systems such as interferometric measurement systems. In order to keep the temperature in the enclosed environment controlled within a desired range, the air circulation or the fan speed of a system has to be fast enough. The faster fan speed, however, generates large acoustic noises and mechanical vibration that results in large measurement error. Accordingly, another aspect of the inventive system is providing a method for minimizing the measurement error resulting from the acoustic noises and the vibration induced from such sources as air circulation. This method includes setting the fan speed at a very low speed or turning off the fan during data acquisition, while maintaining the fan speed at a fast speed during times other than data acquisition.

Prior methods 1-3 mentioned above do not address all of the aspects. Whereas prior method 1 provides a mini environment in a modular chamber, it provides neither temperature nor acoustic noise control. Prior method 2 is capable of controlling temperature and airflow; however it does not control acoustic noise, nor does it control temperature at different locations within the mini-enclosure. Further, its control is independent of the measurement or metrology system within the enclosure. Similarly, prior method 3 has no temperature control, no acoustic noise control, and its control is independent of the measurement or metrology system inside the enclosure.

The inventive system is designed to address the above issues. In order to keep the temperature in the enclosed environment within a desired controlling range, the air circulation or the fan speed of a system has to be fast enough. The faster fan speed, however, generates large acoustic noises and mechanical vibration that results in large measurement error. Therefore, for the inventive system, the faster fan speed is not allowed during the system data acquiring time: the fan is set at a very low speed during data acquisition, and at a fast speed at other times.

Figure 1A:
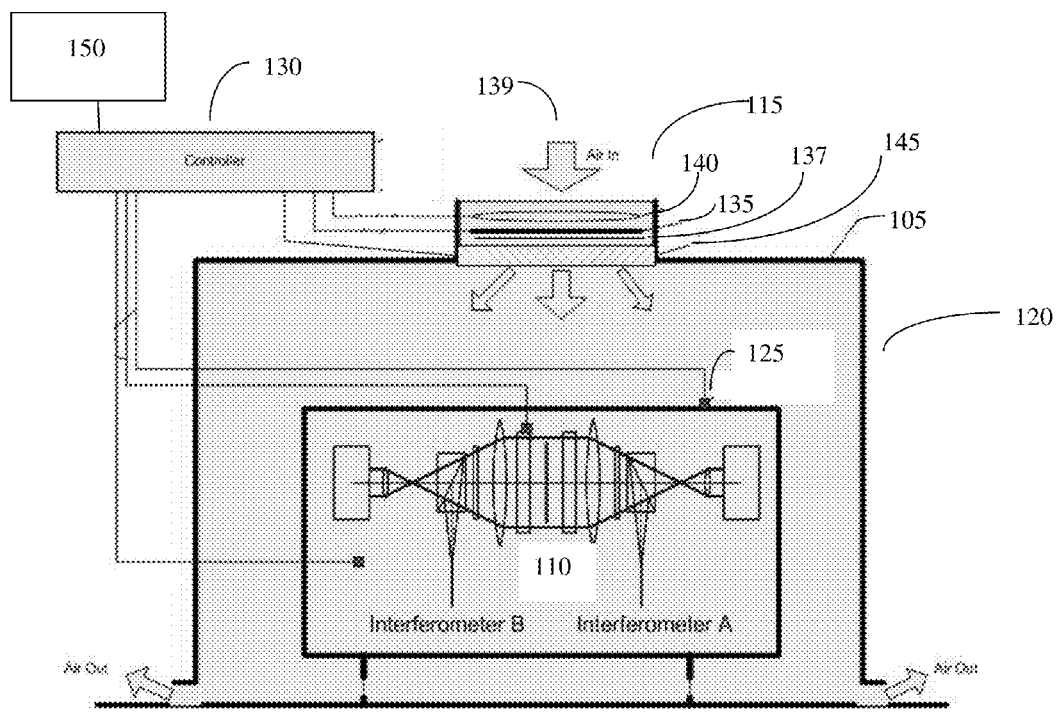
FIG. 1a illustrates an embodiment of the inventive system.

FIG. 1a illustrates an embodiment of the inventive system. Whereas the inventive concept can be employed in conjunction with many types of temperature- and vibration-sensitive equipment (as an example, medical instrumentation), the invention will be illustrated herein with an embodiment directed to interferometric measurement systems. The embodiment of FIG. 1a takes advantage of an existing system that has skin panels 105 which enclose interferometers 110 to create an enclosed minienvironment having forced air circulation. This existing system may be modified as follows: the air circulation unit 115 that delivers air into the enclosure 120 may be modified such that the temperature and the speed of its output to the enclosure are controllable. Note that varying the speed of air circulation or the fan speed changes the amplitude and the frequency of the acoustic noise and mechanical vibration. Multiple temperature sensors 125 may be mounted on interferometers 110 or at any other positions where temperature control is desired. Thus the positioning of the sensors can be customized according to the details of the measurement or metrology system within the enclosure, to provide more accurate temperature feedback to control unit 130. Heating element 135 may be inserted between fan 140 and air filter 145 of unit 115. Optional cooling element 137 may be inserted at any position near air inlet 139. Computer 150 may connect to control unit 130, and may also be used for data acquisition. Control unit 130 controls heating element 135, cooling element 137, and speed of fan 140. It has been found that a single heating element and a single cooling element provides sufficient temperature control, and the multiple sensors provide accurate temperature measurement at multiple points of interest.

Figure 1B:
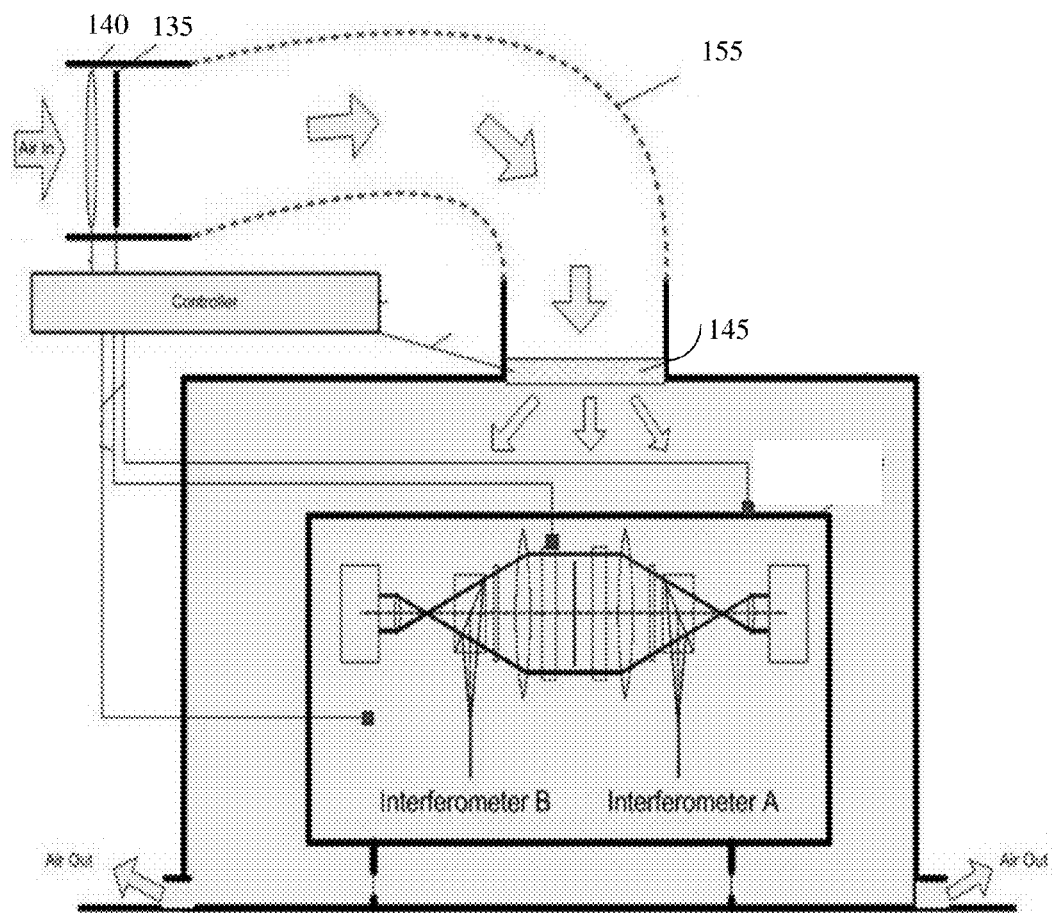
FIG. 1b illustrates a second embodiment of the inventive system, wherein the fan is removed from the mini-enclosure.

Note that the configuration shown in FIG. 1a is exemplary and not limiting. For example, as shown in FIG. 1b, the fan that blows air into the mini-enclosure is not required to be directly at an opening, i.e. proximal, to the mini-enclosure. It can be placed in a position removed from the mini-enclosure, and a duct 155 can be used to bring air into the mini-enclosure. In such a case, the air circulation would still cause vibration and acoustic noise.

Figure 2:
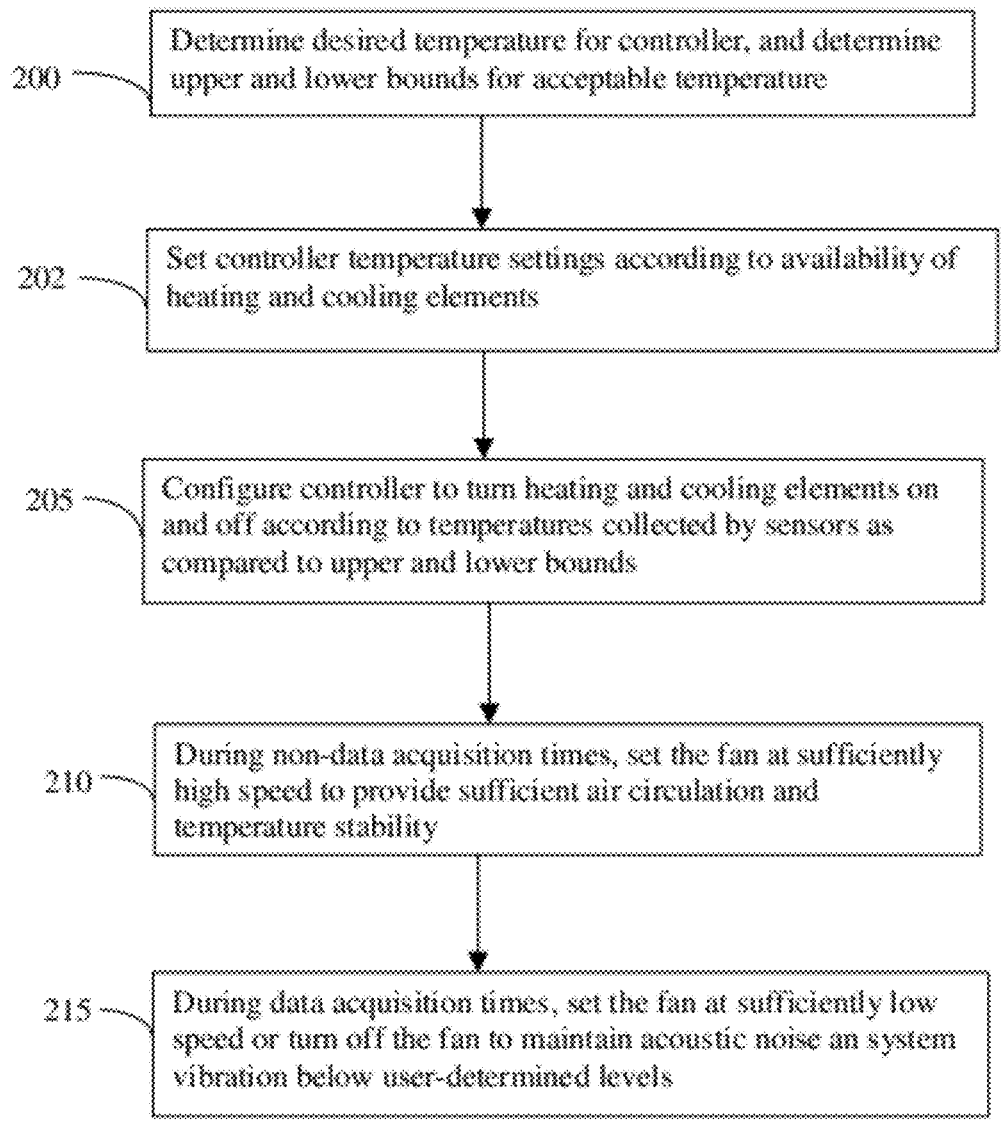
FIG. 2 illustrates a flow diagram of a method embodiment.

FIG. 2 illustrates a flow diagram of a method embodiment.

In step 200, determine a desired temperature for the controlling unit to achieve, and determine a lower bound and an upper bound, i.e., a range about the desired temperature, for acceptable temperature. Utilizing an acceptable temperature range rather than attempting to maintain the temperature at one precise temperature prevents the heating and/or cooling elements from turning on and off too frequently.

In step 202, set the controlling temperature (i.e., the temperature which is set as the desired temperature for the controlling unit to achieve) a few degrees higher than the ambient temperature if there is only heating available. The controlling temperature may be close to the ambient temperature if both heating and cooling are available. The controlling temperature should be set a few degrees lower than the ambient temperature if only cooling is available.

In step 205, set the heating element to turn on if the temperatures collected by the sensors are lower than the heating lower bound of the user-determined desired temperature. Conversely, set the heating element to turn off if the temperatures collected by the sensors are higher than the heating upper bound of the user-determined desired temperature. If a cooling element is included, the cooling element is set to turn on if the temperatures collected by the sensors are higher than the cooling upper bound of acceptable temperature range, and are set to turn off if the temperatures collected by the sensors are lower than the cooling lower bound of the acceptable temperature range. In general, the upper and lower bound settings for heating and cooling are different, to avoid the situation where both the heating and cooling elements are on.

In step 210, during non-data acquisition times, set the fan at a sufficiently high speed to provide sufficient air circulation and temperature stability, as determined by the user.

In step 215, during data acquisition times, set the fan at sufficiently low speed or turn off the fan to maintain acoustic noise and system vibration below user-determined levels.

The method and system as described above enables control of the temperature, acoustic noises, and vibration of the mini-enclosed environment. The accuracy of the temperature control may be improved by locating temperature sensors directly on the metrology instrument. The ability to synchronize data acquisition with air circulation control improves the measurement precision by minimizing acoustic noises and vibration during data acquisition. Experimental results using this method and system with such instruments such as the WaferSight interferometric measuring tool made by KLA-Tencor have demonstrated major precision improvement of the tool. This improves the ability of the tool to meet the stringent requirements demanded by microlithography at the 11 nm node and beyond.

The embodiments described herein or portions thereof may be computer-implemented. The computer system may include a processor (e.g., a processor core, a microprocessor, a computing device, etc.), a main memory and a static memory, which communicate with each other via a bus. The machine may further include a display unit that may comprise a touch-screen, or a liquid crystal display (LCD), or a light emitting diode (LED) display, or a cathode ray tube (CRT). The computer system also may include a human input/output (I/O) device (e.g. a keyboard, an alphanumeric keypad, etc), a pointing device (e.g., a mouse, a touch screen, etc.), a drive unit (e.g., a disk drive unit, a CD/DVD drive, a tangible computer readable removable media drive, an SSD storage device, etc.), a signal generation device (e.g., a speaker, an audio output, etc), and a network interface device (e.g., an Ethernet interface, a wired network interface, a wireless network interface, a propagated signal interface, etc.).

The drive unit may include a machine-readable medium on which is stored a set of instructions (e.g., software, firmware, middleware, etc.) embodying any one, or all, of the methodologies described above. The set of instructions is also shown to reside, completely or at least partially, within the main memory and/or within the processor. The set of instructions may further be transmitted or received via the network interface device over the network bus.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc.); or any other type of media suitable for storing or transmitting information.

It is not expected that the invention be limited to the exact embodiments disclosed herein. Those skilled in the art will recognize that changes and modifications can be made without departing from the inventive concept. The scope of the invention may be construed in view of the claims.

With this in mind, we claim:

1. An apparatus for providing environmental control for a vibration sensitive measurement system including a metrology instrument comprising:
   an enclosure enclosing said vibration sensitive measurement system, said enclosure having a thermally stable mini environment within substantially the entire enclosure;
   said enclosure having forced air circulation within provided by an air circulation unit, said air circulation unit including a fan having a fan speed;
   a controller configured to control said air circulation unit and said fan speed;

said controller configured to set the fan speed at a very low speed or zero speed during data acquisition times, and to maintain the fan speed at a fast speed during non-data acquisition times, thereby reducing or eliminating measurement error of said vibration sensitive measurement system resulting from fan-induced acoustic noises and vibration.

2. The apparatus of claim 1,
further including means for controlling temperature within said enclosure.

3. The apparatus of claim 2,
wherein said means for controlling temperature within said enclosure includes:
a heating element within said enclosure;
wherein said controller is further configured to control said heating element; and
further including at least one temperature sensor within said enclosure, said at least one temperature sensor providing temperature feedback to said controller.

4. The apparatus of claim 3, wherein at least one said temperature sensor is mounted on said metrology instrument.

5. The apparatus of claim 3, further including a cooling element within said enclosure, wherein said controller further controls said cooling element.

6. The apparatus of claim 1, wherein said fan is proximal an opening to said enclosure.

7. The apparatus of claim 1, wherein said fan is in a position removed from an opening to said enclosure, and wherein a duct brings air from said fan into said enclosure.

8. The apparatus of claim 1, wherein said very low fan speed is sufficiently low to maintain acoustic noise and system vibration below user-determined levels.

9. The apparatus of claim 1, wherein said fast fan speed is a sufficiently high speed to provide user-determined sufficient air circulation and temperature stability.

10. The apparatus of claim 1, wherein said vibration sensitive measurement system is an interferometric measurement system.

* * * * *